United States Patent

Pueschel et al.

[11] Patent Number: 6,059,380
[45] Date of Patent: May 9, 2000

[54] HYDRAULIC BRAKE SYSTEM FOR A VEHICLE

[75] Inventors: Helmut Pueschel, Marbach; Guenther Schmidt, Tauberbischofsheim, both of Germany

[73] Assignee: Robert Bosch GmbH, Stuttgart, Germany

[21] Appl. No.: 08/983,540

[22] PCT Filed: May 7, 1997

[86] PCT No.: PCT/DE97/00921

§ 371 Date: Jan. 8, 1998

§ 102(e) Date: Jan. 8, 1998

[87] PCT Pub. No.: WO97/42067

PCT Pub. Date: Nov. 13, 1997

[30] Foreign Application Priority Data

May 8, 1996 [DE] Germany .......................... 196 18 402

[51] Int. Cl.[7] .................................................. B60K 8/02
[52] U.S. Cl. .................................. 303/113.2; 303/113.3; 303/116.2; 303/116.4
[58] Field of Search ............................ 303/10, 11, 113.2, 303/116.4, 116.2, 116.1

[56] References Cited

U.S. PATENT DOCUMENTS 5,335,981  8/1994  Volz et al. ........................... 303/113.3

FOREIGN PATENT DOCUMENTS

| 482367 | 4/1992 | European Pat. Off. ............ 303/113.2 |
| 3337545 | 4/1985 | Germany . |
| 406107147 | 4/1994 | Japan ................................. 303/113.2 |
| 406107148 | 4/1994 | Japan ................................. 303/113.2 |
| 406107149 | 4/1994 | Japan ................................. 303/113.2 |
| 92/17357 | 10/1992 | WIPO . |

*Primary Examiner*—Matthew C. Graham
*Attorney, Agent, or Firm*—Ronald E. Greigg; Edwin E. Greigg

[57] ABSTRACT

The invention relates to a vehicle hydraulic brake system having a traction control unit and a dynamic driving control unit. To enable building up pressure quickly with a return feed pump, even when the master cylinder is not actuated, a precharge pump, which is mounted on the storage container of the master cylinder and can be made to communicate with the master cylinder through a valve that is mounted in the storage container following the master cylinder. When the master cylinder is not actuated, pressure can be built up in the master cylinder and thus in the vehicle brake system using the precharge pump.

12 Claims, 7 Drawing Sheets

Fig. 5

HYDRAULIC BRAKE SYSTEM FOR A VEHICLE

PRIOR ART

The invention relates to a hydraulic brake system for a vehicle having a traction control unit and a dynamic driving control unit.

Known vehicle brake systems of this kind have a brake pressure modulating valve assembly with one inlet valve and one outlet valve for each wheel brake cylinder, and one return feed pump. The return feed pump, when the brake pressure in a wheel brake cylinder drops, pumps brake fluid released from the wheel brake cylinder back into the master cylinder, or pumps it into the wheel brake cylinder in order to raise the brake pressure.

Problems arise if when the master cylinder is not actuated brake pressure is to be built up, an example being during drive slip control and dynamic driving control. The pressureless brake fluid flows only slowly to the return feed pump, and the pressure buildup is therefore delayed. This may still be acceptable for traction control, but for dynamic driving control a very much faster pressure buildup is necessary, to counteract fishtailing of a vehicle at the very outset.

German Published, Non-Examined Patent Disclosure DE-OS 33 37 545 discloses a precharge pump which is disposed between a brake fluid storage container and the master cylinder and pumps into one of the two pressure chambers of the tandem master cylinder. As a result, when the master cylinder is not actuated, brake pressure in the appropriate brake circuit can be built up very quickly, that brake fluid flows under pressure and thus in an adequate volumetric flow to the return feed pump.

However, the known vehicle brake system has the disadvantage that for the conventional brake actuation without anti-lock control, traction control or dynamic driving control, the precharge pump must be capable of having a flow through it in both directions, so as to assure the necessary flow of brake fluid from the storage container into the master cylinder and vice versa. Hence only special types of pump can be used as the precharge pump, namely hydrodynamic pumps such as centrifugal or flyweight pumps, which when at a standstill can have a flow of brake fluid through them in both directions.

A centrifugal pump would have to be embodied with multiple stages, to meet the demands made of a precharge pump. This makes it expensive. A further factor is that because of the high pump rpm, cavitation and the formation of gas bubbles must be expected, which would cause damage to the centrifugal pump and lead to impairment in the function of the brake system.

Other types of pump as the precharge pump have the disadvantage of throttling the flow of brake fluid, that is, of hindering the flow of brake fluid from the storage container to the master cylinder and back. Centrifugal and flyweight pumps are therefore poorly suited as precharge pumps.

ADVANTAGES OF THE INVENTION

In the vehicle brake system of the invention a hydraulic element assures the free flow of brake fluid from the storage container into the master cylinder and in the opposite direction when the precharge pump is stopped. The flow of brake fluid between the storage container and the master cylinder is not hindered by the precharge pump, so that when the precharge pump is not in operation it has no effects whatever on the function of the vehicle brake system. If the master cylinder is not actuated, it is possible with the precharge pump to build up a pilot pressure in the master cylinder and hence in the vehicle brake system that can be rapidly increased with the return feed pump to a necessary brake pressure to enable rapid response of the traction control and dynamic driving control units.

Another advantage of the invention is that the precharge pump need not be capable of having a flow through it in both directions when it is at a standstill, and a wide variety of pumps are therefore available to choose from. Nor is a high-quality, high-efficiency pump necessary, since with the precharge pump only a pilot pressure is generated, which is raised by the return feed pump to the necessary brake pressure. Accordingly, inexpensive pumps, which already exist and have been tested over time can be used. Moreover, recourse may be made to hydraulic elements that have already proven themselves in vehicle brake systems of this kind.

The invention additionally has the advantage that the structural height of the master cylinder with the storage container is not increased, since the precharge pump need not be disposed between these two components but instead can be mounted at some point where structural space is available.

In a simple embodiment of the invention the precharge pump pumps directly into the master cylinder and, through a throttle as the hydraulic element, into the storage container. Accordingly, the brake fluid stream is split, flowing partly into the storage container and partly into the master cylinder. No special throttle is absolutely necessary: the flow resistance of a brake fluid line may suffice, or a bore may be provided in the pressure line from the precharge pump to the storage container connection.

Preferably, the hydraulic element is a valve which in its basic position enables an unhindered flow from the storage container to the master cylinder and in the opposite direction, and in a switching position connects the pressure side of the precharge pump to the master cylinder.

The valve may be a magnet valve, which by way of example is triggered by a control unit required for the purposes of traction control or dynamic driving control, or a hydraulically actuated valve which is controlled by the feed pressure of the precharge pump.

By disposing the precharge pump below a brake fluid level in the storage container and specifically where the brake fluid storage container has largely been emptied, it is assured that the precharge pump on being turned on is filled with brake fluid and can thus build up brake pressure in the vehicle brake system without delay.

For rapid restoration of a hydraulically actuated precharge valve, in accordance with claim 10 the precharge pump is switched off, and with the return feed pump, brake fluid is aspirated through the precharge valve, which is in its switching position and in this position connects the pressure side of the precharge pump to the master cylinder. In this way, the brake fluid pressure on the pressure side of the precharge pump, which keeps the hydraulically actuated precharge valve in its switching position, rapidly drops, and the precharge valve reaches its basic position, in which it connects the master cylinder to the storage container, so that the brake fluid can flow unhindered back out of the vehicle brake system into the storage container through the master cylinder.

BRIEF DESCRIPTION OF THE DRAWINGS

The invention will be described in further detail in terms of exemplary embodiments shown in the drawings. Shown are.

DESCRIPTION OF THE EXEMPLARY EMBODIMENTS

Figure 1:
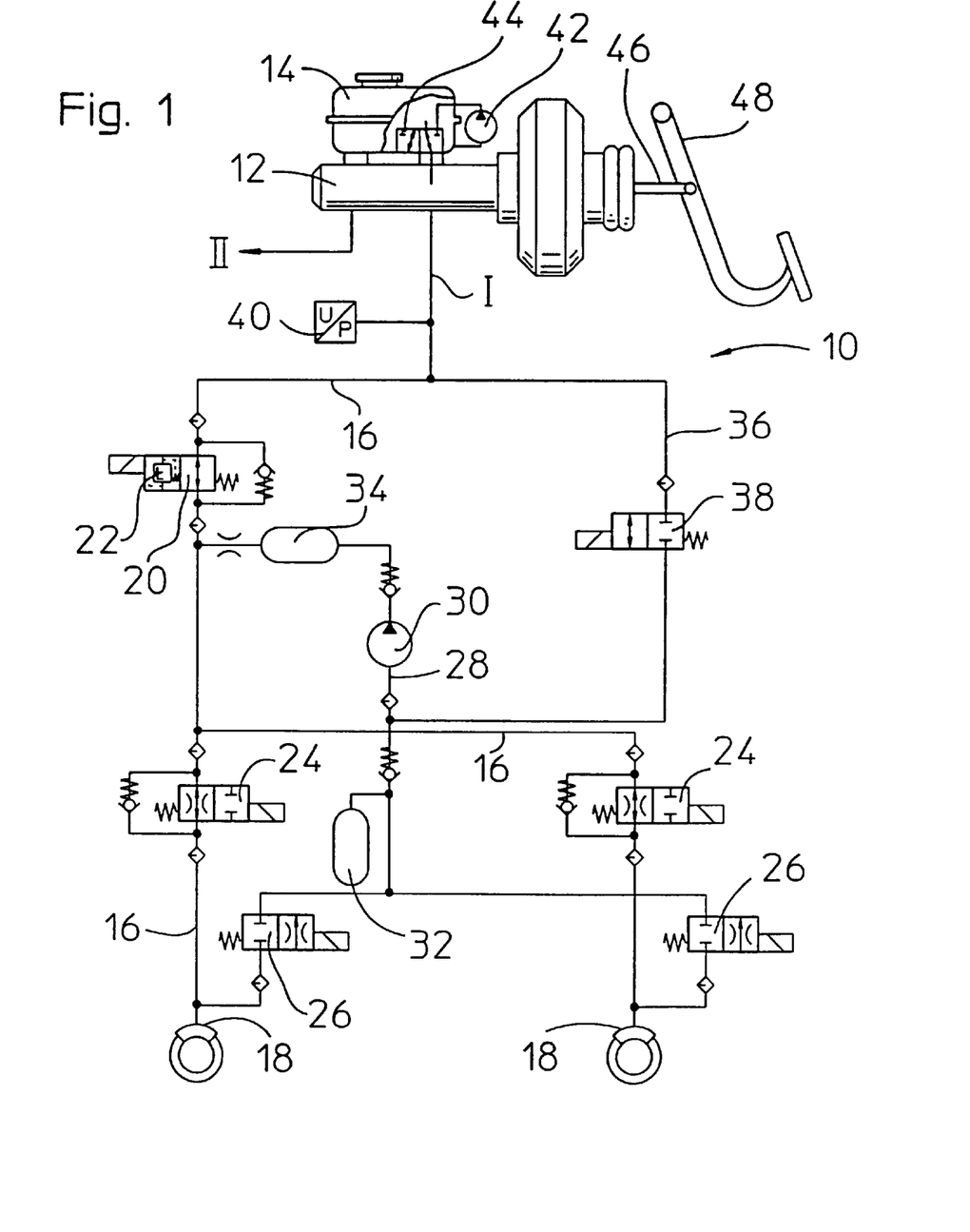
FIG. 1, a hydraulic circuit diagram of a vehicle brake system according to the invention.

In FIG. 1, a brake circuit I of a dual-circuit vehicle brake system 10 according to the invention is shown. The brake circuit II, not shown, is structurally the same as the brake circuit I shown and functions in the same way.

The vehicle brake system 10 has a tandem master cylinder 12 with a storage container 14. A branching main brake line 16 leads to wheel brake cylinders 18 connected to this brake circuit I. A switchover valve 20, which is open in its basic position, with an integrated pressure limiting valve 22 is incorporated into the main brake line 16. Each wheel brake cylinder 18 is preceded by an inlet valve 24 which is open in its basic position.

Each wheel brake cylinder 18 also has an outlet valve 26, which is closed in its basic position, and from which a common return line 28 leads to the main brake line 16 and discharges between the switchover valve 20 and the inlet valves 24. Incorporated into the return line 28 is a return feed pump 30, which is preceded by a reservoir 32 and followed by a damper 34.

The inlet valve 24 and outlet valve 26 form a brake pressure modulating valve assembly of the respective wheel brake cylinder 18, and with these assemblies, in a manner known per se, the brake pressure in the wheel brake cylinder 18 can be modulated, in order to prevent or limit slip of the corresponding vehicle wheel upon braking (anti-lock control), upon startup (traction control), or in order by means of purposeful braking of one vehicle to reduce its cornering force in order to prevent fishtailing of the vehicle (dynamic driving control).

The brake pressure modulation is accomplished with the aid of the return feed pump 30. The switchover valve 20 may be closed during the brake pressure modulation, in order to prevent feedback effects on the master cylinder 12. The inlet valve 24 and outlet valve 26 may for instance also be combined into one 3/3-way valve, instead of the separate 2/2-way valve shown.

An intake line 36 leads from the master cylinder 12 to a suction side of the return feed pump 30. An intake valve 38 which is closed in its basic position is disposed in the intake line 36. Through the intake line 36, when the intake valve 38 is open, the return feed pump 30 receives brake fluid directly from the master cylinder 12, which is a prerequisite for a rapid pressure buildup.

A pressure sensor 40 is also connected to the master cylinder 12. All the valves 20, 24, 26, 38 are magnet valves. In order to supply an adequate quantity of brake fluid to the return feed pump 30 when the master cylinder 12 is not actuated, the vehicle brake system 10 of the invention has a precharge pump 42, which may be disposed directly on the storage container 14 and whose suction side receives brake fluid from the storage container 14. The precharge pump 42 pumps brake fluid into the master cylinder 12 through a 3/2-way precharge valve 44. The precharge valve 44 is disposed in the storage container 14 immediately following the master cylinder 12. In its basic position, the precharge valve 44 opens a passage from the storage container 14 into the master cylinder 12, so that braking takes place as usual.

When the precharge pump 42 is in operation, the precharge valve 44 is switched over; it closes the passage from the storage container 14 into the master cylinder 12 and causes a pressure side of the precharge pump 42 to communicate with the master cylinder 12. In this way, with the precharge pump 42, pressure can be built up in the master cylinder 12 when the master cylinder is not actuated. Through the intake line 36 and the opened intake valve 38, the return feed pump 30 can therefore be supplied if needed with a sufficient quantity of brake fluid for a rapid pressure buildup in the wheel brake cylinders 18, even if the master cylinder 12 is not actuated.

The precharge pump 42 preferably pumps into a primary or "rod circuit" pressure chamber 50 of the master cylinder 12 (see FIG. 2a), in which brake pressure is built up directly by a brake pedal 48, via a pedal rod 46 and a rod piston 49. Conversely, in the secondary or "floating circuit" pressure chamber 54, brake pressure is built up indirectly via the pressure in the rod circuit. Connecting the precharge pump 42 to the rod circuit has the advantage that via the pressure generation in the rod circuit, pressure is generated in the floating circuit as well; that is, pressure is generated in both brake circuits I, II with one precharge pump 42. Nevertheless, both brake circuits I, II remain separate from one another, so that a failure of one brake circuit will not impair the function of the other brake circuit.

Figure 2A:
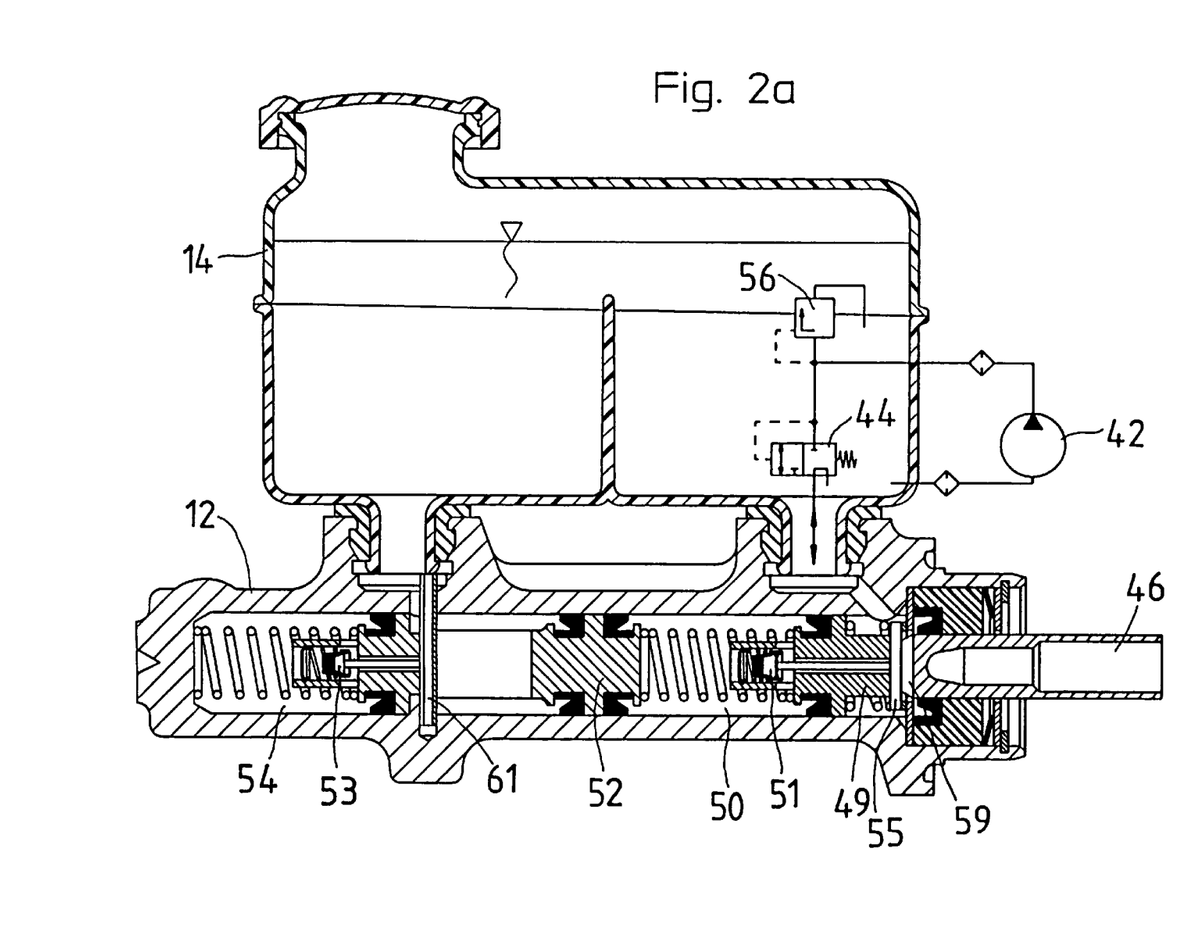
FIGS. 2a, c and d, illustrate details of embodiments of the vehicle brake system of FIG. 1.

FIG. 2a shows the hydraulic connection of the precharge pump 42. It aspirates from the storage container 14, and its pressure side is connected to the rod circuit 50 of the master cylinder 12 by the 3/2-way precharge valve 44. In its basic position, the precharge valve 44 connects the storage container 14 to the pressure chamber 50 of the rod circuit, so that an exchange of brake fluid between the storage container 14 and the master cylinder 12 can take place as usual. In the switching position, the precharge valve 44 connects the pressure side of the precharge pump 42 to the pressure chamber 50 of the master cylinder 12 and disconnects the storage container 14 from the master cylinder 12, so that brake fluid from the storage container 14 is pumped by the precharge pump 42 under pressure into the master cylinder 12 and from there reaches the brake circuit I shown in FIG. 1.

The generation of pressure in the pressure chamber 50 of the rod circuit displaces a flow piston 52 of the master cylinder 12, and as a result brake fluid pressure is built up in a pressure chamber 54 of the floating circuit as well, so that pressure is also generated in the second brake circuit II, not shown.

The precharge valve 44 is hydraulically actuated; its actuation is effected by imposition of pressure from the pressure side of the precharge pump 42. As a result, the precharge valve 44 connects the precharge pump 42 to the master cylinder 12 when the precharge pump 42 is put into operation and generates pressure.

In addition to the precharge valve 44, a pressure limiting valve 56, which discharges into the storage container 14, is connected to the pressure side of the precharge pump 42.

For the sake of clarity with regard to the drawing, it is noted that brake fluid can reach the pressure chamber 50 of the rod circuit of the master cylinder 12 only through the precharge valve 44, but not by bypassing this valve.

Both pistons 49, 52 of the master cylinder 12 have a central valve 51, 53, which is opened when the master cylinder is not actuated, so that brake fluid can flow out of the storage container 14 into the two pressure chambers 50, 54 of the master cylinder 12 and in the opposite direction.

Figure 2B:
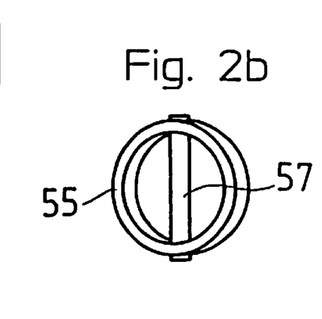
FIG. 2b, illustrates a detail of FIGS. 2a, c and d.

The central valve 51 of the rod piston 49 is held in the open position, when the master cylinder 12 is not actuated, by a control ring 55 with a transverse pin 57 (FIG. 2b). The transverse pin 57 of the control ring 55 reaches through a transverse opening 59 in the rod piston 49, and as a result the control ring 55 has a defined axial play on the rod piston 49. It moves along with the rod piston 49. When the master cylinder 12 is not actuated, the control ring 55 rests on the master cylinder 12 and thereby, via its transverse pin 57, opens the central valve 51 of the rod piston 49.

When the master cylinder 12 is not actuated, the central valve 53 of the float piston 52 is held in its open position by a slit expansion bush 61, which is inserted crosswise into the master cylinder 12 and at the same time forms a stop for the float piston 52, and through which brake fluid from the storage container 14 passes into the master cylinder 12 and back again.

The two central valves 51, 53, when the master cylinder 12 is actuated, act as check valves, which open in the direction of the respective pressure chamber 50, 54 of the master cylinder 12.

In order to return the hydraulically actuated precharge valve 44, once it has been put into its switching position by operation of the precharge pump 42, rapidly to its basic position when the master cylinder 12 is not actuated, the precharge pump 42 is turned off, and with the return feed pump 30 brake fluid is briefly aspirated through the precharge valve 44. This causes the pressure on the pressure side of the precharge pump 42, which keeps the precharge valve 44 in its switching position, to drop rapidly, and the precharge valve 44 returns to its basic position, in which it connects the master cylinder 12 with the storage container 14.

Next, brake fluid can be pumped in a manner known per se with the return feed pump 30 from the wheel brake cylinders 18 through the master cylinder 12 into the storage container 14. To return the hydraulically actuated precharge valve 44, the switchover valve 20 is closed, and both the intake valve 38 and the inlet valve 24 and outlet valve 26 are all opened.

It is possible to return brake fluid from one of the wheel brake cylinders 18 if the master cylinder 12 is not actuated with the return feed pump 30 through the pressure limiting valve 56, even if the precharge valve 44 is in its switching position.

Figure 2C:
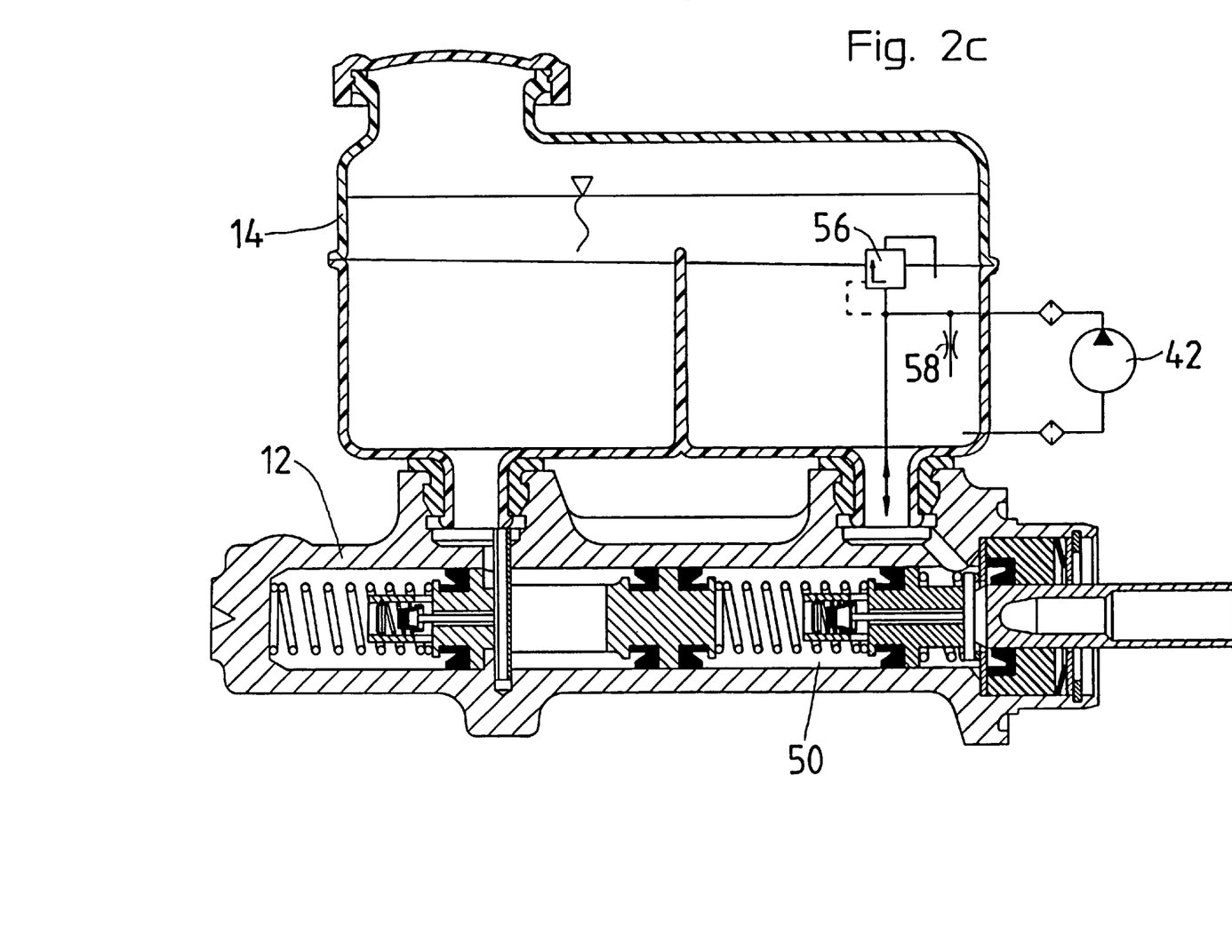

FIG. 2c shows a modification of the embodiment of the invention shown in FIG. 2a. The precharge valve 44 is missing here, and instead the pressure side of the precharge pump 42 communicates directly with the pressure chamber 50 of the master cylinder 12 and parallel to it with the storage container 14 through a throttle 58. As long as the precharge pump 42 is out of operation, the storage container 14 communicates with the master cylinder 12 through the throttle 58, and accordingly the vehicle brake system 10 functions as usual. As soon as the precharge pump 42 starts pumping, the stream of brake fluid is split between the pressure chamber 50 of the master cylinder 12 and, through the throttle 58, the storage container 14. The throttle 58 accordingly brings about a pressure buildup in the master cylinder 12 and hence in the vehicle brake system 10 connected to it.

To limit the precharge pressure, the pressure limiting valve 56 known from FIG. 2c is present. This embodiment of the invention is simpler and hence less expensive in its construction than the embodiment shown in FIG. 2a. The throttle 58 can be realized by a line whose length and cross section effect throttling. It is not absolutely necessary to include a special throttling element.

Figure 2D:
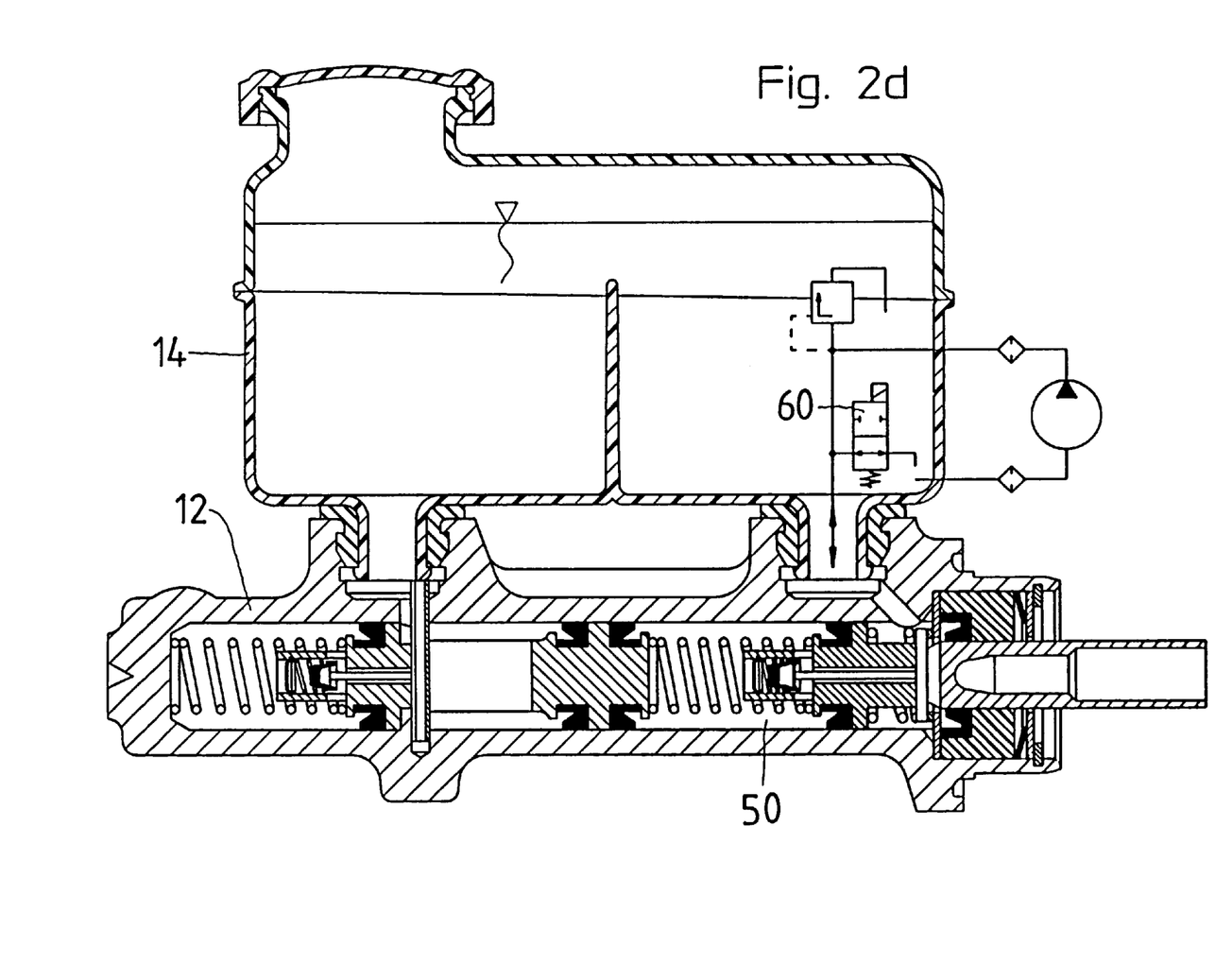

FIG. 2d shows a further embodiment of the invention. In it, unlike the embodiment of the invention shown in FIG. 2a, the precharge valve is embodied as a magnet valve 60. Otherwise, these two embodiments are alike and reference is made to the explanation of FIG. 2a. The use of a magnet valve as a precharge valve 60 has the advantage that this valve can very quickly be brought into its basic position, in which the passage from the pressure chamber 50 of the rod circuit of the master cylinder 12 into the storage container 14 is open, in order to quickly reduce a brake pressure in the vehicle brake system 10 of the invention.

Figure 3A:
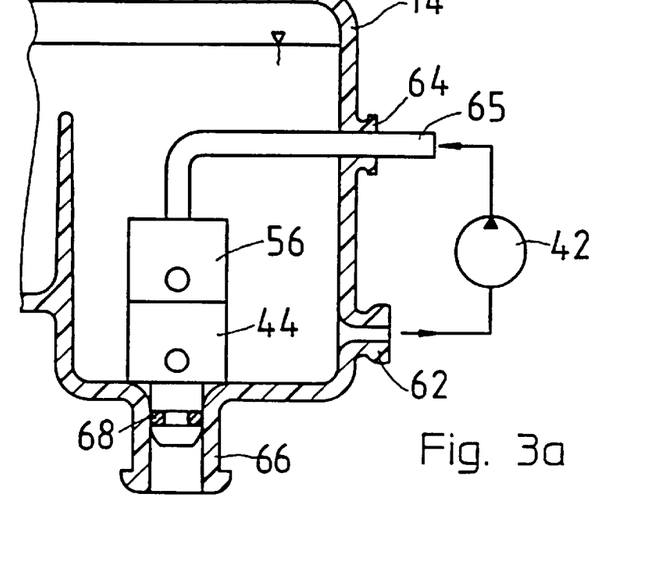
FIGS. 3a and b, illustrate structural possibilities for mounting and connecting a precharge pump in the vehicle brake system of the invention.

In FIG. 3a, the installation of the precharge valve 44 and pressure limiting valve 56 in the storage container 14 is shown. The brake fluid container 14 has a lateral connecting branch 62 for the intake side of the symbolically represented precharge pump 42, at a low point of the storage container 14. By means of a further connecting branch 64 in a side wall of the storage container 14, a line 65 leads from the pressure side of the precharge pump 42 to a structural unit that contains both the precharge valve 44 and the pressure limiting valve 56. This unit is inserted into a connecting branch 66 of the storage container 14 and is sealed off with an O-ring 68. With the connecting branch 66, the storage container 14 is flanged to the master cylinder 12 in a manner known per se (FIG. 2a).

Figure 3B:
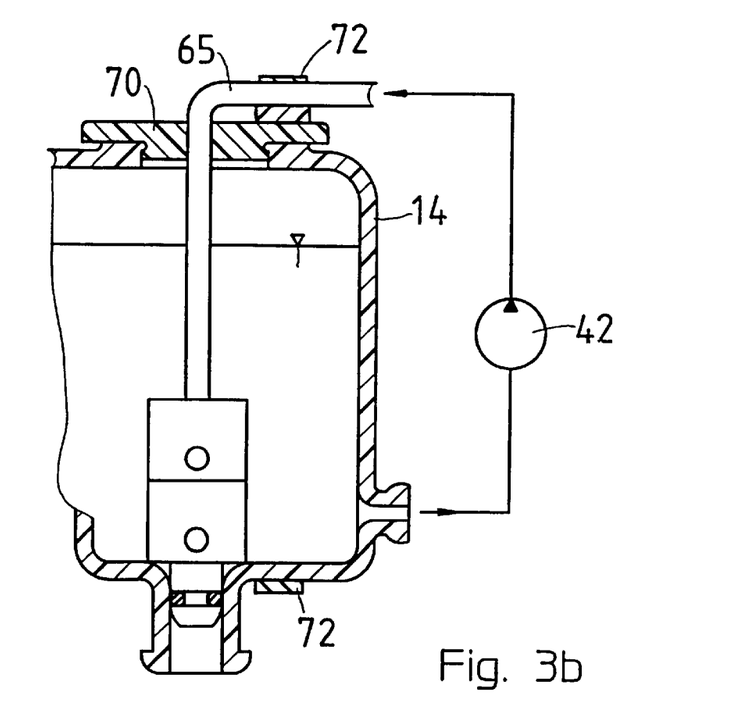

In FIG. 3b, the line 65 from the pressure side of the precharge pump 42 is extended through a refill cap 70 of the storage container 14 and secured with a rubber clamping band 72. Otherwise, this embodiment of the invention has the same construction as that of FIG. 3a. Reference is made to the corresponding description.

Figure 4A:
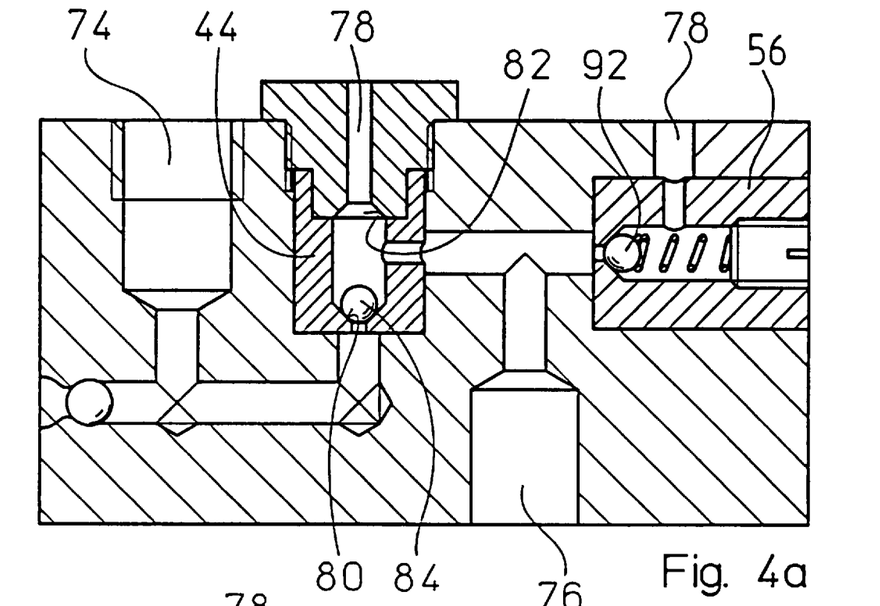
FIGS. 4a, b, and c, illustrate hydraulic components of the vehicle brake system of the invention.
Figure 4B:
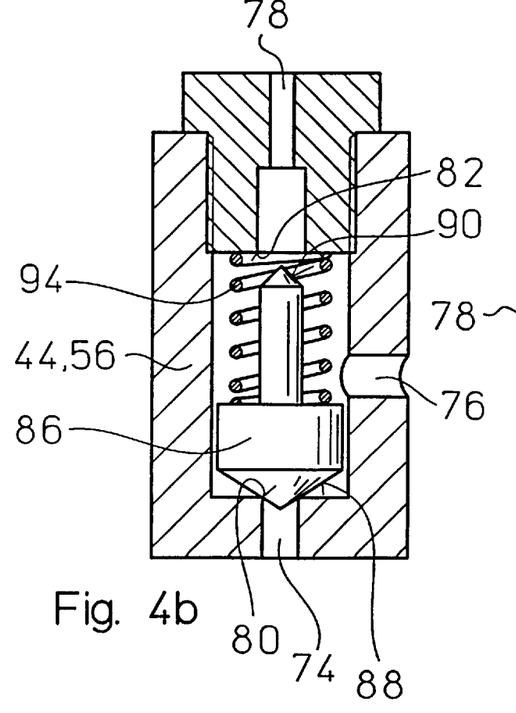
Figure 4C:
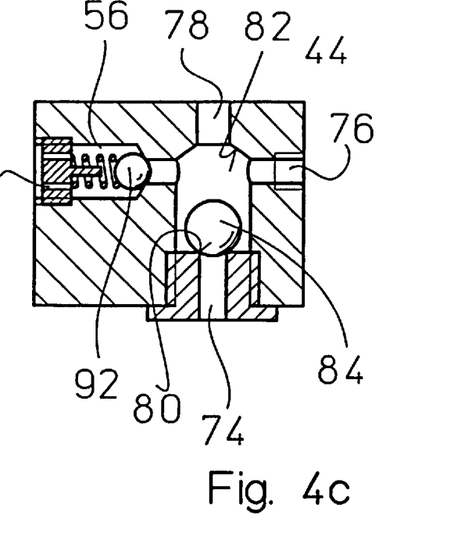

FIGS. 4a–c show section views of units, which include the precharge valve 44 and pressure limiting valve 56, intended for installation in the storage container 14. They have a connecting branch 74 for the pressure side of the precharge pump 42, a connecting branch 76 for the pressure chamber 50 of the rod circuit of the master cylinder 12, and one or two openings 78 as applicable for the inflow and outflow of brake fluid in the storage container 14. The precharge valve 44 has two opposed valve seats 80, 82 and a ball 84 as a valve closing body, or a valve closing body 86 with two valve cones 88, 90. The valve bodies 84, 86 enable a flow from the opening 78 toward the container to the connecting branch 76 toward the master cylinder. If the precharge pump 42 pumps brake fluid into the connecting branch 74, this fluid moves the valve body 84, 86 toward the opposite valve seat 82 and thus closes the passage from the storage container to the master cylinder and opens the passage from the pressure side of the precharge pump to the master cylinder. The precharge valves 44 shown in FIGS. 4a–c are accordingly hydraulically actuated valves that are controlled by the feed pressure of the precharge pump 42.

As the pressure limiting valve 56, the structural units of FIGS. 4a and c have an overpressure valve, known per se, with a spring-loaded valve ball 92. In the exemplary embodiment of FIG. 4b, the valve body 86 is spring-loaded and is pressed by a helical compression spring 94 against the valve seat 80 that communicates with the pressure side of the precharge pump 42. Thus in FIG. 4b the precharge valve 44 at the same time embodies the pressure limiting valve 56 for the precharge pump 42.

Figure 5:
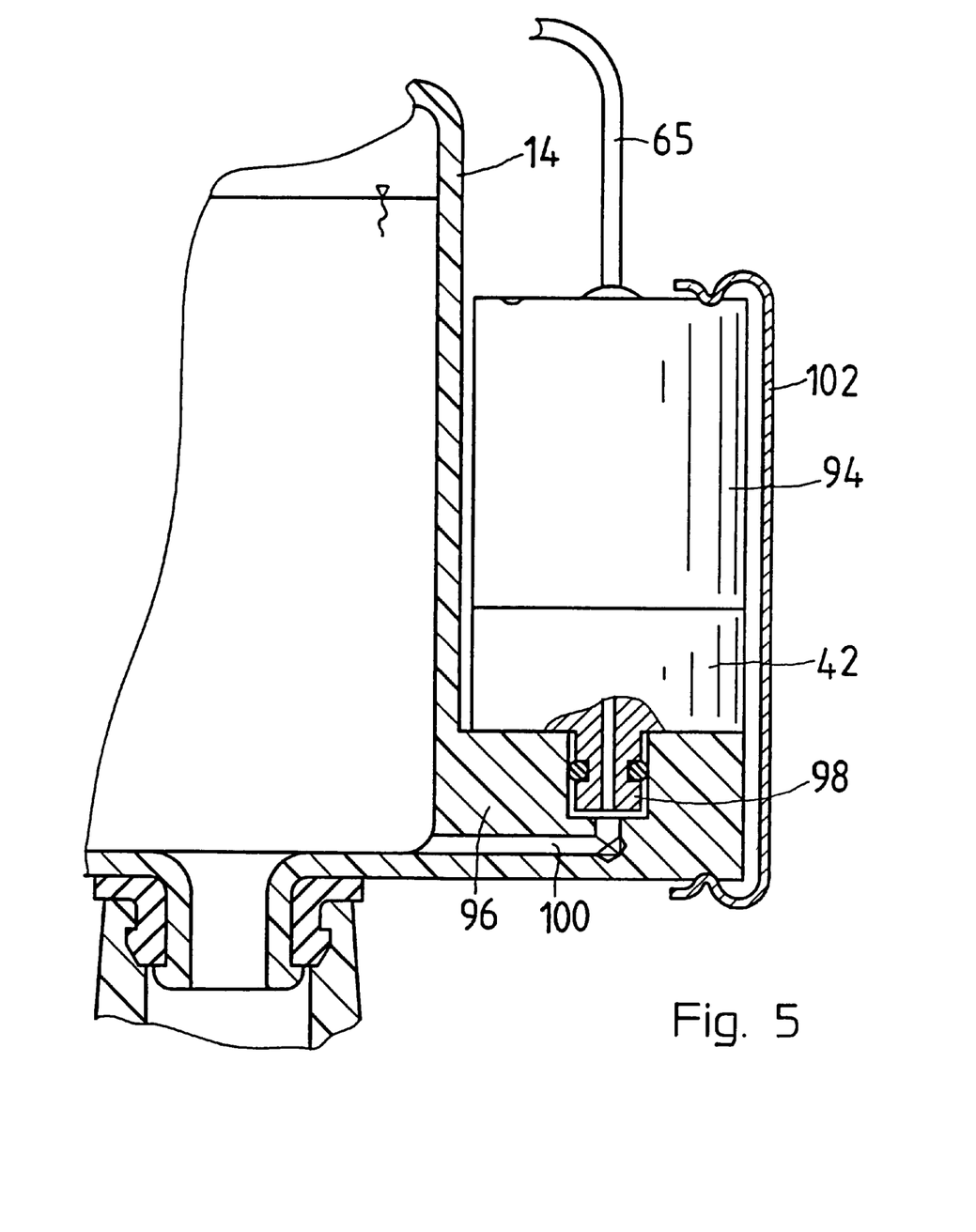
FIG. 5, illustrates one possible way of mounting a precharge pump in accordance with the invention.

In the embodiment of FIG. 5, the precharge pump 44 is mounted directly on the storage container 14, together with an electric drive motor 94 to which it is flanged. To that end, the storage container 14 has a lateral extension 96, protruding from its underside, into which the precharge pump 42 is flanged with a trunnionlike intake connection 98. From the storage container 14, an angled conduit 100 leads to the intake connection 98 of the precharge pump 42.

The structural unit comprising the precharge pump 42 and drive motor 94 is retained by means of a spring clip 102, in the form of a metal clamp, which engages an underside of the extension 96 of the storage container 14 and a top face end of the pump drive motor 94. A pressure line 65 is connected to the circumference of the precharge pump 42 and is extended, as shown in FIG. 3b, into the storage container 14. In FIG. 5, the pressure line 65 extends behind the precharge pump 42 and the pump motor 94.

This way of mounting the precharge pump 42, with its pump motor 94, directly on the brake fluid storage container 14 has the advantage of a compact structure and of a short intake connection of the precharge pump 42 to the storage container 14, which as a result has little flow resistance. A further advantage is that the precharge pump 42 is mounted below a brake fluid level in the storage container 14 and as a result is always filled with brake fluid, so that it immediately builds up pressure when turned on. The precharge pump 42 is mounted at such a low point on the storage container 14 that it is always located below the surface of the brake fluid even if the brake fluid is at a minimal level.

For testing the precharge components of the vehicle brake system of the invention, the test cycle described below is performed: after the vehicle ignition is turned on, or even while the vehicle is at a standstill or during vehicle travel, the inlet valves 24 of the wheel brake cylinders 18 are closed and the precharge pump 42 is turned on, with the master cylinder 12 not actuated. With the pressure sensor 40, the rise of pressure in the master cylinder 12 is monitored. If a predetermined pressure fails to be attained within a predetermined time, then some malfunction is involved. If the predetermined pressure is attained within the predetermined time, then the precharge pump 42 is turned off again, and the drop in brake fluid pressure in the master cylinder 12 is monitored with the pressure sensor 40. If the pressure in the master cylinder 12 does not drop to zero (optionally plus a tolerance) within a predetermined period, then once again some defect is involved.

The foregoing relates to preferred exemplary embodiments of the invention, it being understood that other variants and embodiments thereof are possible within the spirit and scope of the invention, the latter being defined by the appended claims.

We claim:

1. A vehicle hydraulic brake system, having a drive slip-control and/or driving dynamics control unit comprising a master cylinder (12), having a storage pressure chamber (14) for brake fluid, having a wheel brake cylinder (18) with which a brake pressure modulating valve assembly (24, 26) is associated, a return feed pump (30) for returning brake fluid, released from the wheel brake cylinder, in a direction of the master cylinder, a precharge pump (42) having a pressure delivery outlet that communicates with said pressure chamber of the master cylinder, the pressure delivery outlet of the precharge pump (42), communicates with the pressure chamber (14) through a hydraulic element (44, 58, 60) the pressure chamber of the brake master cylinder, the pressure chamber has a connection piece (66) located on a same side of the pressure chamber as the brake master cylinder which penetrates into the latter, the delivery side of the precharge pump (42) communicates, by means of said connection piece (66), with the pressure chamber (50) of the brake master cylinder (12), and the precharge pump (42) delivers fluid at a low pressure which prefills the wheel brake cylinder (18) by means of a brake-pressure which prefills the wheel brake cylinder (18) by means of a brake-pressure modulation valve arrangement (24), for applying fluid to the brake linings, and charges the return pump (30) by means of a suction line (36) and a suction valve (38) installed in the suction line and capable of being opened for the traction control mode and/or driving dynamics control mode, a hydraulic element (56) being designed to limit the low pressure from the precharge pump.

2. A vehicle hydraulic brake system as defined by claim 1, in which the hydraulic element is a throttle (58).

3. A vehicle hydraulic brake system as defined by claim 1, in which the hydraulic element is a precharge valve (44, 60), through which the pressure side of the precharge pump (42) communicates with either the storage container (14) or the pressure chamber (50) of the master cylinder (12).

4. A vehicle hydraulic brake system as defined by claim 3, in which the precharge valve is a magnet valve (60).

5. A vehicle hydraulic brake system as defined by claim 3, in which the precharge valve is a valve (44) actuated hydraulically by a feed pressure of the precharge pump (42).

6. A vehicle hydraulic brake system as defined by claim 1, in which the precharge pump (42) communicates with the storage container (14) through a pressure limiting valve (56).

7. A vehicle hydraulic brake system as defined in claim 1, in which the brake system has two brake circuits independent of one another, which are connected to a tandem master cylinder (12), and that the precharge pump (42) communicates with a primary or piston-rod circuit pressure chamber (50) of the master cylinder (12).

8. A vehicle hydraulic brake system as defined by claim 1, in which the precharge pump (42) is disposed below a brake fluid level in the storage container (14).

9. A vehicle hydraulic brake system as defined by claim 8, in which the precharge pump (42) is mounted on the storage container (14).

10. A method for operating a vehicle hydraulic brake system as defined by claim 5, in which to terminate an anti-lock, traction-control or dynamic driving control operation, comprising switching off the precharge pump (42) and aspirating the brake fluid briefly through the precharge valve (44) by the return feed pump (30).

11. A method for testing a vehicle hydraulic brake system as defined by claim 9, the method steps comprising switching off the master cylinder (12), closing all the inlet valves (24) of the wheel brake cylinders (18);

switching on the precharge pump (42); and monitoring and assessing any rise in brake fluid pressure with the precharge pump (42) switched on.

12. The method as defined by claim 11, which comprises: switching off the precharge pump (42); and monitoring and assessing the rise in brake fluid pressure with the precharge (42) switched off.

* * * * *